Patented Aug. 12, 1924.

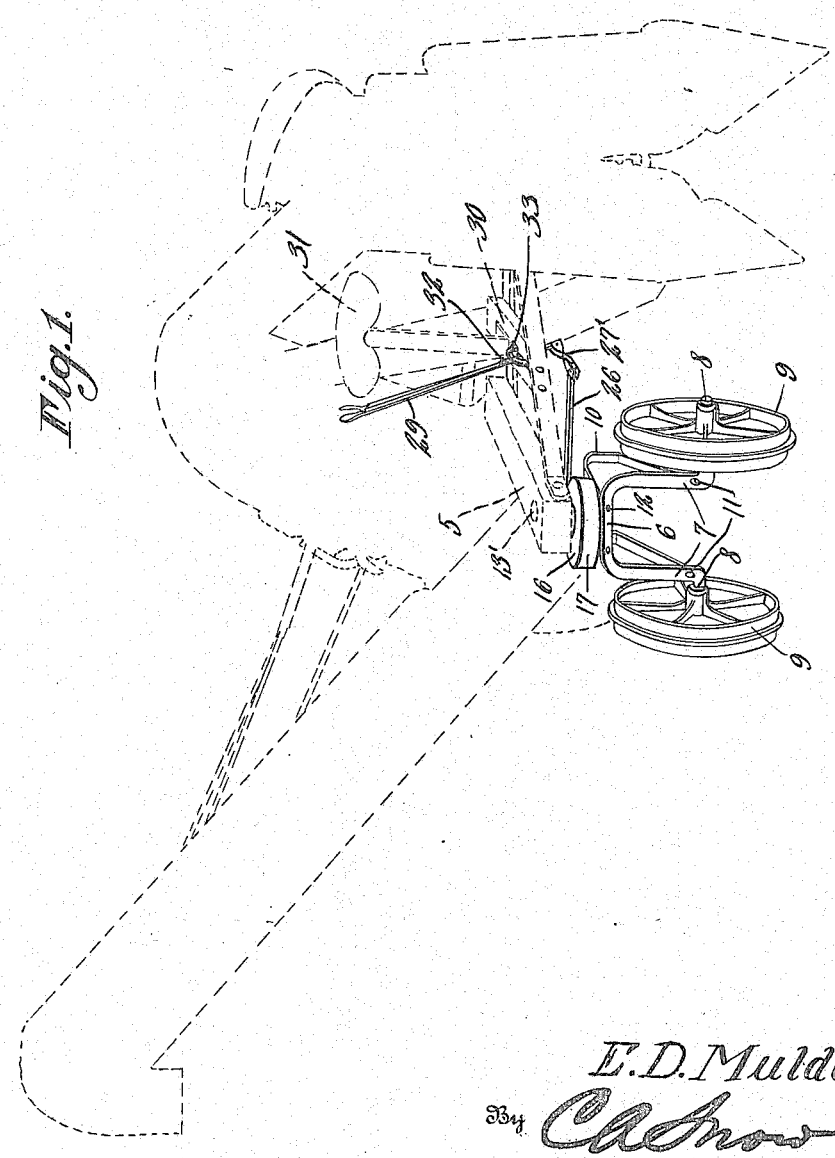

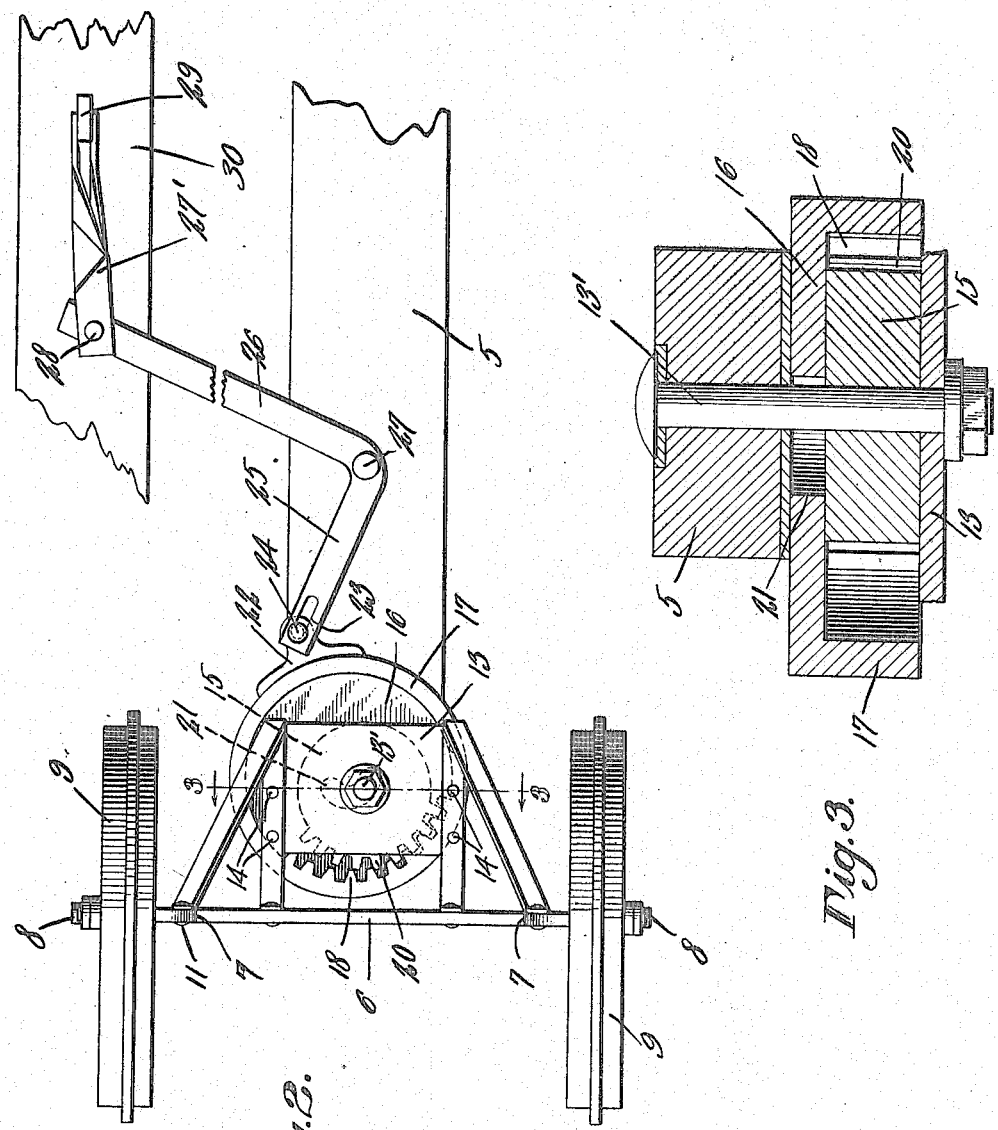

1,504,263

UNITED STATES PATENT OFFICE.

EDWARD D. MULDER, OF ORANGE CITY, IOWA.

STEERING DEVICE.

Application filed April 29, 1922. Serial No. 557,275.

*To all whom it may concern:*

Be it known that I, EDWARD D. MULDER, a citizen of the United States, residing at Orange City, in the county of Sioux and State of Iowa, have invented a new and useful Steering Device, of which the following is a specification.

This invention relates to an attachment to be used in connection with farm machinery of the horse-drawn type, the primary object of the invention being to provide means for guiding the machine to prevent the machine from breaking or knocking down the material being cultivated or harvested.

Another object of the invention is to provide a device of this character which may be locked in a predetermined position to prevent the animals drawing the machine, from deviating a directed path of travel, but at the same time permit of adjustment of the front wheels of the machine in a lateral direction with respect to the stub tongue forming a part of the machine.

With the foregoing and other objects in view which will appear as the description proceeds, the invention resides in the conbination and arrangement of parts and in the details of construction hereinafter described and claimed, it being understood that changes in the precise embodiment of the invention herein disclosed, maybe made within the scope of what is claimed, without departing from the spirit of the invention.

Referring to the drawings:—

Figure 1 is a perspective view disclosing the guiding device as secured to the frame of a corn picking machine, the outline of the machine being shown in dotted lines.

Figure 2 is a fragmental bottom plan view disclosing the guiding device as applied to the stub tongue of the machine.

Figure 3 is a sectional view taken on line 3—3 of Figure 2.

Referring to the drawings in detail, the reference character 5 designates the stub tongue of a corn picking machine, to the forward end of which is secured the guiding truck 6.

The guiding truck 6 includes a substantially inverted U-shaped member 7 having right angled extremities providing axles 8 on which the wheels 9 revolve.

Arms 10 extend rearwardly and have their lower ends connected to the truck 6 as at 11, the opposite ends having connection with the upper portion of the frame as at 12, the arms being disposed in spaced relation with each other to provide a support for the plate 13 which is secured to the arms as by means of the bolts 14.

A segmental gear 15 is secured to the plate 13 as by means of the bolt 13′, so that movement of the gear will result in a relative movement of the truck to guide the machine to which the device is secured. Positioned under the stub tongue 5 is a disk 16 that has a downwardly extending circumferential flange 17, there being provided teeth 18 formed on the inner wall thereof, the teeth being designed to mesh with the teeth 20 of the segmental gear 15.

Formed in the upper surface of the disk 16 is a curved opening 21 adapted to accommodate the bolt 13′, whereby the disk is permitted to move laterally with respect to the stub tongue 5 to accomplish the moving of the disk and guiding truck.

Secured to the flange 17 of the disk 16 is a bracket member 22 that is formed with an opening adapted to accommodate the bolt 24, which bolt operates in the elongated openings 23 formed in the right angled extremity 25 of the arm 26. This arm 26 is fulcrumed on the stub tongue 5 as by means of the bolt 27, the opposite end of the arm 26 having pivotal connection with the operating arms 27 as at 28, the operating arms being however connected with a controlling lever 29 that extends upwardly through the bar 30 forming a part of the frame of the machine. Thus it will be seen that the controlling lever 29 operates in proximity to the operator's seat which is indicated at 31, so that the operator may readily grip the controlling lever to move the guiding truck to accomplish the guiding of the vehicle.

Associated with the controlling lever 29 is a pawl 32 and rack member 33, which are adapted to cooperate to lock the guiding truck in predetermined positions of adjustment, thereby providing a structure wherein the wheels of a guiding truck may be set, to the end that the machine will not move from a directed path of travel.

What is claimed as new is:—

1. In combination with the stub tongue of an agricultural machine, a guiding truck, means for pivotally connecting the guiding truck to the stub tongue, a segmental gear carried by the guiding truck, a disk having a depending flange, housing the segmental gear, said disk having a curved opening, said curved opening adapted to accommodate the connecting means between the guiding truck, and stub tongue to permit of lateral movement of the guiding truck with respect to the tongue, and means for rotating the disk to move the guiding truck.

2. In combination with the stub tongue of an agricultural machine, a guiding truck, a disk supported under the tongue and having an elongated opening, a segmental gear disposed under the disk, teeth carried by the disk adapted to cooperate with the teeth of the segmental gear, whereby movement of the disk produces a relative movement of the gear, a bolt extending through the gear and elongated opening of the disk to connect the gear and disk, and means for moving the disk to shift the bolt in the elongated opening.

In testimony that I claim the foregoing as my own, I have hereto affixed my signature in the presence of two witnesses.

EDWARD D. MULDER.

Witnesses:
T. M. ZINK,
T. HANSEN.